(No Model.) 2 Sheets—Sheet 1.

C. T. BROWN.
LOCK HOOK.

No. 404,160. Patented May 28, 1889.

Witnesses,
W. Rossiter
M. E. Dayton

Inventor:
Charles T. Brown.

(No Model.) 2 Sheets—Sheet 2.

C. T. BROWN.
LOCK HOOK.

No. 404,160. Patented May 28, 1889.

Witnesses.
W. Rossiter
M. E. Dayton

Inventor!
Charles T. Brown.

UNITED STATES PATENT OFFICE.

CHARLES T. BROWN, OF CHICAGO, ILLINOIS, ASSIGNOR TO FLORA L. BROWN, OF SAME PLACE.

LOCK-HOOK.

SPECIFICATION forming part of Letters Patent No. 404,160, dated May 28, 1889.

Application filed March 18, 1889. Serial No. 303,651. (No model.)

*To all whom it may concern:*

Be it known that I, CHARLES T. BROWN, a citizen of the United States, and a resident of Chicago, in the county of Cook and State of Illinois, have invented certain new and useful Improvements in Lock-Hooks, of which the following is a description.

The invention herein set out is one of improvements upon the invention made by me and set out and described in my application for Letters Patent therefor, Serial No. 303,823, and filed of even date herewith, and is embodied in the several devices and combination of devices described in the following specification and the accompanying drawings.

The principal objects of this invention are to simplify and improve the construction of said previously-described lock-hook, to obviate the necessity of employing skilled labor in its manufacture, to provide forms of the several parts adapted to be made by stamping them from sheet metal, to facilitate the assembling of the parts, and to lessen the danger of injury to some of the parts by use.

Figure 1:
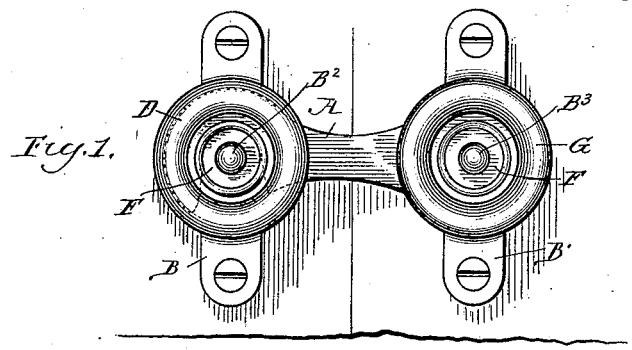
Figure 2:
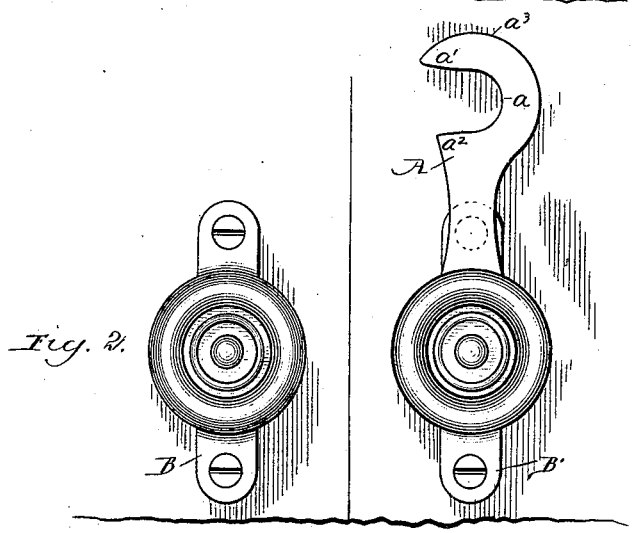
Figure 3:
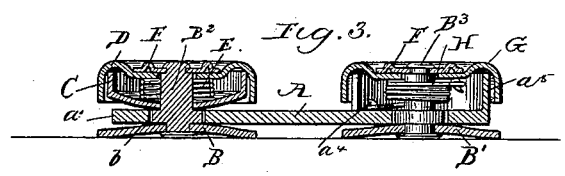
Figure 4:
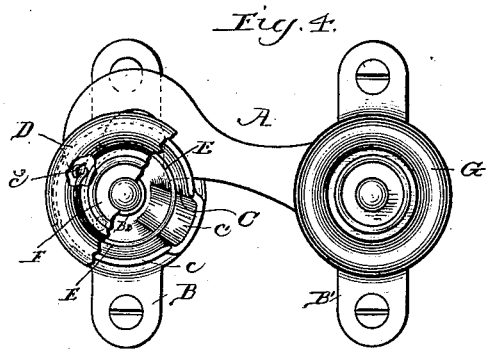
Figure 5:
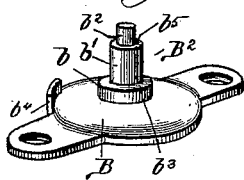
Figure 6:
Figure 7:
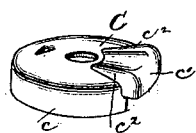
Figure 8:
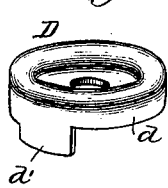
Figure 9:
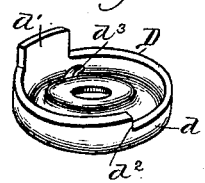
Figure 10:
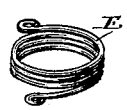
Figure 11:
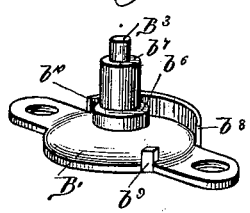
Figure 12:
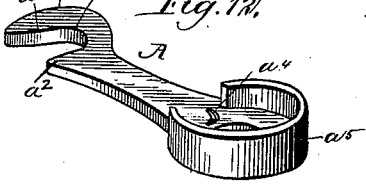
Figure 16:
Figure 13:
Figure 14:
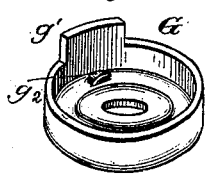
Figure 15:

In the accompanying drawings, Figure 1 is a front view of a lock-hook embodying my present improvements with the hook engaged. Fig. 2 is a front view of the same with the hook retracted from the stud with which it engages. Fig. 3 is a sectional view of Fig. 1 on a line extending through the pivot of the hook and the stud it engages. Fig. 4 is a front view of the hook proper and of the locking device, with the hook shown as about to be placed on the stud. A portion of the top disk forming part of the locking device is broken away in this figure (4) to expose the under disk of the same locking device to view. Fig. 5 is a perspective of the base supporting the stud and locking device. Fig. 6 is a top perspective of the under disk of the locking device, and Fig. 7 is a perspective of the same disk viewed from the under side. Fig. 8 is a top perspective of the upper disk of the locking device, and Fig. 9 is a perspective of the same disk viewed from the under side. Fig. 10 is a perspective of the spring which is placed between the disks illustrated in Figs. 6, 7, 8, and 9. Fig. 11 is a perspective of the base to which the hook is pivoted. Fig. 12 is the hook proper. Fig. 13 is a top perspective of the cap which is placed over the pivoted end of the hook, and Fig. 14 is a perspective of said cap viewed from the under side. Fig. 15 is a perspective of the spring which is placed between the pivoted end of the hook and the cap therefor, and which is engaged at one end with the cap and at the other end with the hook. Fig. 16 is a perspective of a disk which is secured to the top of the post on which the hook is pivoted, and a duplicate whereof is also secured to the top of the post which the hook engages.

Like parts illustrated in more than one figure are given the same letter of reference throughout.

A is the hook.

B is the base for the support of the stud or post which the hook engages, and on which are rotatively supported the disks constituting the locking device.

B' is the base for the stud or post which forms the pivot of the hook, and on which the cap covering the pivoted end of the hook is secured for the retention of a spring by which the hook is retracted, (when such retracting device is employed,) and for the purpose of giving uniformity of appearance to the opposite ends of the hook structure as a whole. The stud or post $B^2$, with which the hook engages, consists of three parts, $b$, $b'$, and $b^2$, of unequal diameter. The lower or inner portion, $b$, is of the greatest diameter, and is that portion of the post which the notch $a$ of the hook embraces when engaged therewith. Upon the next and smaller section, $b'$, of the post $B^2$ the locking-disks are rotatively mounted, being confined by the smaller disk or head secured upon the still smaller extremity, $b^2$, of said post. The base B, being of sheet metal, has the post $B^2$ secured thereto by riveting, as indicated in Fig. 3, and on the margin of said base is thrown up a short projection, $b^4$, to serve as a stop for the rotating locking-disks.

The locking-disks are two in number, each having a central hole loosely fitting the middle part, $b'$, of the post $B^2$. C is the inner disk, stamped from sheet metal, which rests on the shoulder $b^3$ of the post $B^2$, and is therefore supported at a distance slightly in excess of the thickness of the hook A from the adjacent surface of the base B. The disk C is provided with an outwardly-turned peripheral flange, $c$, which may extend entirely around the disk to a uniform height. The disk is also provided with a lug or projection, $c'$, which projects beyond the general periphery of the disk, and also beyond the lower face thereof, and into close proximity with the upper face of the base B. The outer end of the lug or projection $c'$ is struck with a flange in continuation of the flange $c$, but of less height and of greater radius than the latter. The lug $c'$ extends nearly to the central hole in the disk, and is slightly narrower between its radial sides $c^2$ than the width of the notch $a$ of the hook which embraces said lug. The flange $c$ need not extend across the lug $c'$, and when this lug is struck up from the body of the disk C the flange does not extend across it. The disk C is also provided on the inside with the projection $c^3$, which, as illustrated, is struck up from the body of the disk and stands in an inclined position to engage the end of the spring hereinafter to be described. The other of the two locking-disks is marked D, and is provided with a peripheral and inwardly-directed flange, $d$, which is of about the same radius as the flange on the lug $c'$ on the disk C, and which embraces the flange $c$ of the inner disk, C. The disk D rests on the edge of said flange $c$, and at one point (lettered $d'$) the flange $d$ projects into close proximity with the base B. On the flange $d$ is formed a shoulder, $d^2$, some distance from the projection $d'$, against which shoulder the lug $c'$ on the disk C is yieldingly held by the spring between the disks when the hook is either retracted or is fully engaged with the stud $B^2$, and this shoulder $d^2$ is so located that when the lug or projection $c'$ is in contact therewith said projection and the flange projection $d'$ are substantially opposite each other. Said flange $d'$ will desirably be of about the same breadth as the outer end of the projection $c'$, but may be somewhat wider. From the inner surface of the disk D stands a projection, $d^3$, corresponding to the projection $c^3$ of the disk C, for the purpose of engaging one end of the spring which is to be placed between the disks C and D. E is said spring, which is desirably spiral in form, as illustrated in Fig. 10, and has its ends bent to engage with the projections $c^3$ and $d^3$. These projections stand oppositely directed, and the spring is so constructed as when engaged therewith to hold the projection $c'$ of the disk C with slight force (according to the size of the structure) against the shoulder $d^2$ of the disk D. The position of the spring in the space between the disks C and D is well illustrated in Fig. 3.

To hold the disks C and D, together with the spring E, which is confined between them, in proper position upon the post $B^2$, the third disk F is placed upon the post $B^2$ on the reduced extremity $b^2$ thereof, and resting upon the shoulder $b^5$, and is there riveted securely, as illustrated in Fig. 3. Preferably, and for the sake of neatness of appearance, the outer disk, D, is sunken, or has a depression in its outer surface to accommodate this disk F, as is also shown in Fig. 3. The disk may desirably have an annular bead thrown up thereon, as indicated in Fig. 16. The hook A has a notch, $a$, embraced between the finger $a'$ and the heel $a^2$, the space between the point and heel, or, in other words, the width of the notch $a$, being such as to allow the hook to freely pass over the post $B^2$ until the part $b^3$ strikes the bottom of the notch, and in doing so to admit the inwardly-projecting portion of the lug $c'$ of the disk C.

In assembling the parts attached to the base B the disk C is placed on the post $B^2$ with the lug $c'$ on the side toward the hook-pivot, as shown in Fig. 4, and the disk D will therefore have its flange projection $d'$ on the opposite side, or the side remote from the hook-pivot. In forcing the hook over the post $B^2$ the heel $a^2$ of the hook will, therefore, strike against the lug $c'$, and will rotate the same as the hook advances to its final position on the post. Meantime the flange projection $d'$ on the disk D will be thrown over against the outer curved edge, $a^3$, of the finger $a'$, and will be retarded thereby until the bottom of the notch $a$ in the hook strikes or approximates the post, when the said projection $d'$ on the disk D will be free to pass over the back of the hook-bow, made of proper width for this purpose. The projection $d'$ on the disk D will be retained in this position by the force of the spring E, and it will thus hold the hook locked from disengagement from the post $B^2$, because the lug $c'$ on the disk C is held from rotation within the notch of the hook. To detach the hook, the outer disk, D, is rotated by the hand to its former position at the side of the finger $a'$, and while there held the hook may be retracted from engagement with the post $B^2$. In retracting the hook while the outer disk is so held in the position last described the inner disk, C, will rotate back to a position in which its lug $c'$ will be substantially opposite the flange projection $d'$.

The locking devices are complete as above described, and the hook may be simply mounted on an ordinary pivot, in which case the hook will be retracted by hand; or said hook may be provided with a spring at its pivoted end, by which it will be automatically retracted whenever the disk D is rotated by hand to carry the flange projection $d'$ away from the back of the hook-finger $a'$ and to the side thereof.

In the smaller sizes of the lock-hook, of which one size is here illustrated, it will be desirable, for the sake both of appearance and convenience, to provide a spring for retracting the hook; and to this end the constructions illustrated in detail in Figs. 11, 12, 13, 14, 15, 16, and 3 may be employed. Describing these, the base B' has a post or pivot, $B^3$, having the shoulders $b^6$ and $b^7$. Upon shoulder $b^7$ rests the cap illustrated in Figs. 13 and 14. This cap (marked G) corresponds, essentially, with the outer disk, D, of the locking device described, but is destitute of the shoulder $d^2$ of said disk D. It has, however, a peripheral flange, $g$, one portion of which is extended, as seen at $g'$. The cap or disk G is placed on the post $B^3$, with its flange directed inwardly and with the margin of its central hole resting upon the shoulder $b^7$ of said post at a suitable distance from the base B'. This disk is non-revoluble, and is held from rotation by the stops $b^8$ and $b^9$ on the base B', which stand on opposite sides of the flange projection $g'$. The disk G is held in place on the post $B^3$ by means of a disk or head, F, as seen in Fig. 3. The hook A, occupying the lower portion of the post $B^3$, swings in the space between the base B' and the narrower part of the flange $g$, and within the limits allowed it by the stops $b^8$ and $b^9$. The stop $b^9$ will be on the side of the base B' toward the base B, and the stop $b^8$ will preferably be extended such a distance that the opposite end, $b^{10}$, thereof will arrest the hook when at about right angles to its locked position.

The spring H shown in Fig. 15 is like that shown in Fig. 10, except that it is coiled in the opposite direction, and the ends of said spring are engaged, one with the hook itself and the other with the cap G. For this purpose the cap and the hook are severally provided with projections $g^2$ and $a^4$.

The pivoted end of the hook is desirably made circular and provided with a marginal flange, $a^5$, which rises within the cap G into proximity with the latter, as shown in Fig. 12. This flange serves to better retain the hook in its proper plane.

Having thus described my invention, what I claim, and desire to secure by Letters Patent, is—

1. A locking device for a hook, consisting of a stud, two disks rotatively mounted on the stud, each having an inwardly-directed ear extending into the plane of the hook, and a spring between and engaging both the disks, which spring yieldingly holds the ears substantially opposite each other, substantially as described.

2. A locking device for a hook, consisting of a stud, two disks rotatively mounted on the stud, of which the outer one has an inwardly-projecting marginal flange outside the plane of the hook and an ear, $d'$, extending into the plane of the hook, and the inner one of which has a projection, $c'$, adapted to enter the notch of the hook and extending into the plane of the hook, and a spring between and engaging the two disks, which spring yieldingly holds the ear $d'$ and projection $c'$ substantially opposite each other, substantially as described.

3. A locking device for a hook, composed of a stud, two disks having oppositely-directed marginal flanges set one within the other and forming an inclosed space between them, a projection on each disk extending into the plane of the hook, and a spring arranged between and engaged with the disks, which yieldingly holds the projections substantially opposite each other, substantially as described.

4. In a hook-locking device, the combination of the base B, the stud $B^2$ thereon, provided with shoulders, disk C, resting on the inner shoulder of the stud, the disk D, supported by the inner disk, and the retaining-disk F, secured against the outer of the shoulders of the stud, substantially as described.

5. The combination of base B, provided with stop $b^4$ and stud $B^2$, of a disk, C, provided with projection $c'$, proximating the base, the flanged disk D, provided with a marginal projection, $d'$, also proximating the base, and with flange-shoulder $d^2$, and a coiled spring, E, having its ends attached to the several disks and arranged to cause the projection $c'$ to yieldingly bear against the shoulder $d^2$, substantially as described.

6. The combination, with the hook-locking device composed of a base, B, provided with stop $b^4$ and stud $B^2$, disk C, provided with projection $c'$, a flanged disk, D, provided with a marginal projection, $d'$, and flange-shoulder $d^2$, and a coiled spring, E, having its ends attached to the several disks and arranged to cause the projection $c'$ to yieldingly bear against the shoulder $d^2$, of a hook, a base, B', having the stud $B^3$, upon which the hook is pivoted, and provided with the stops $b^8$ and $b^9$, and a flanged cap covering the pivoted end of the hook, substantially as described.

7. In combination with a hook-locking device composed of a base, B, provided with stop $b^4$ and with the stud $B^2$, disk C, provided with projection $c'$, disk D, provided with projection $d'$ and flange-shoulder $d^2$, and coiled spring E, having its ends attached to the several disks and arranged to cause the projection $c'$ to yieldingly bear against the shoulder $d^2$, of a base, B', having the stud $B^3$ and provided with the stops $b^8$, $b^9$, and $b^{10}$, the hook pivoted on the stud, flanged cap covering the pivoted end of the hook and having a projection, $g'$, arranged between the stops $b^8$ and $b^9$, and a spring underneath the cap and engaging therewith and with the hook, substantially as described.

CHARLES T. BROWN.

Witnesses:
M. E. DAYTON,
FLORA L. BROWN.